United States Patent
Egan

(10) Patent No.: US 6,739,642 B1
(45) Date of Patent: May 25, 2004

(54) ELECTRICALLY ACTUATED LIFTING AND TRANSFERRING APPARATUS

(76) Inventor: Thomas F. Egan, 570 Hance Rd., Binghamton, NY (US) 13903

( * ) Notice: Subject to any disclaimer, the term of this patent is extended or adjusted under 35 U.S.C. 154(b) by 0 days.

(21) Appl. No.: 10/354,161

(22) Filed: Jan. 29, 2003

Related U.S. Application Data

(60) Provisional application No. 60/352,209, filed on Jan. 29, 2002.

(51) Int. Cl.[7] ................................................. B60N 2/00
(52) U.S. Cl. ................ 296/63; 296/65.01; 297/DIG. 10
(58) Field of Search ......................... 296/63, 69, 65.01, 296/68.1, 65.11; 297/DIG. 10

(56) References Cited

U.S. PATENT DOCUMENTS 5,040,832 A * 8/1991 Zalewski ................. 296/65.12
6,283,528 B1 * 9/2001 Townsend ................ 296/65.01

* cited by examiner

*Primary Examiner*—Joseph D. Pape
(74) *Attorney, Agent, or Firm*—Thomas E. Anderson

(57) ABSTRACT

An electrically actuated lifting and transferring apparatus for assisting disabled persons when entering and exiting a vehicle is disclosed. The apparatus comprises a horizontal lifting bar disposed longitudinally alongside a seat of the vehicle between the seat and a door opening of the vehicle. The apparatus also comprises an electrical actuator indirectly coupled to the horizontal lifting bar for forcing the horizontal lifting bar between a lowered position directly adjacent and level with the seat and a raised position away from and above the seat. The apparatus further comprises at least one mounting bracket for securing an assembly comprising the horizontal lifting bar and the electrical actuator directly to the seat.

4 Claims, 6 Drawing Sheets

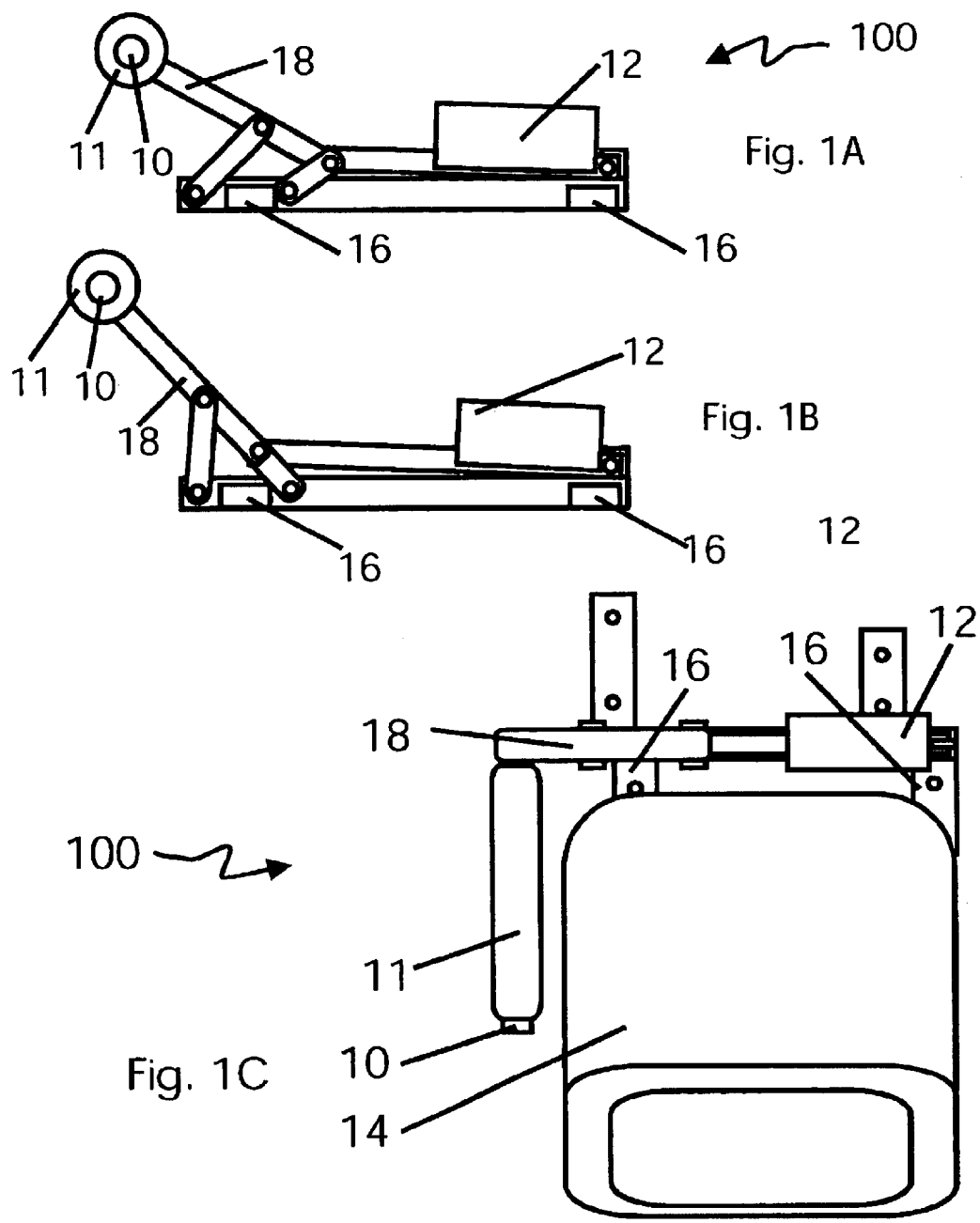

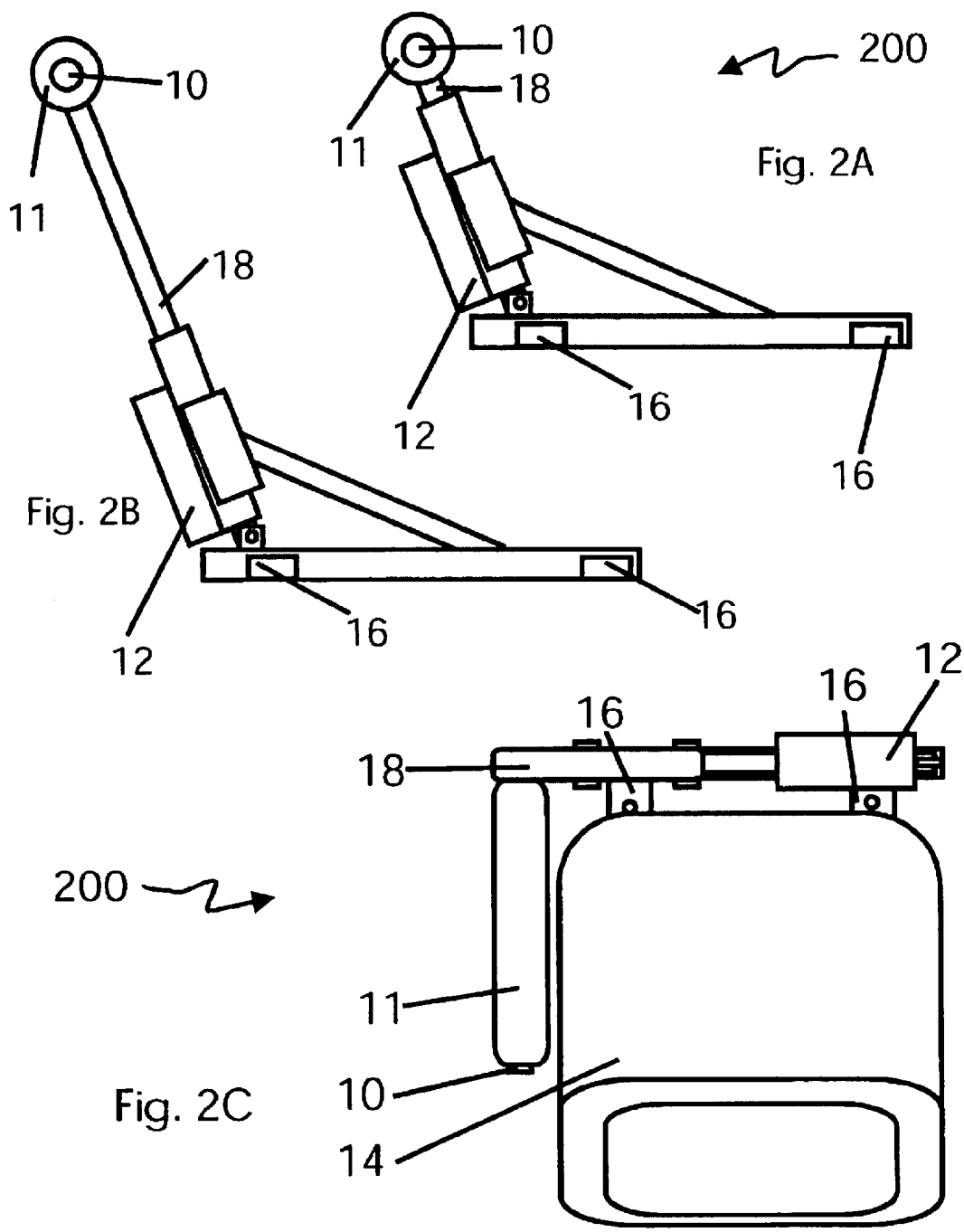

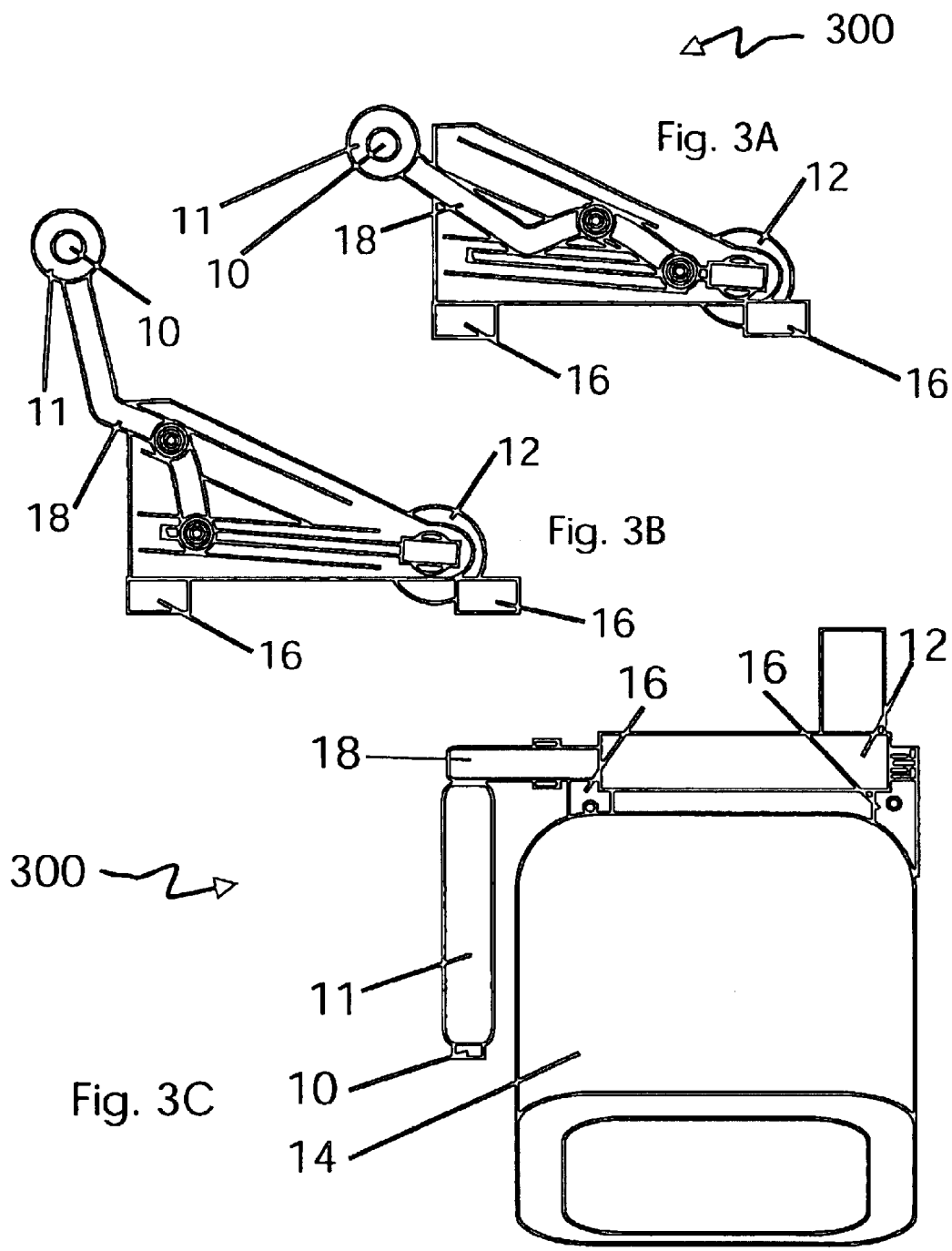

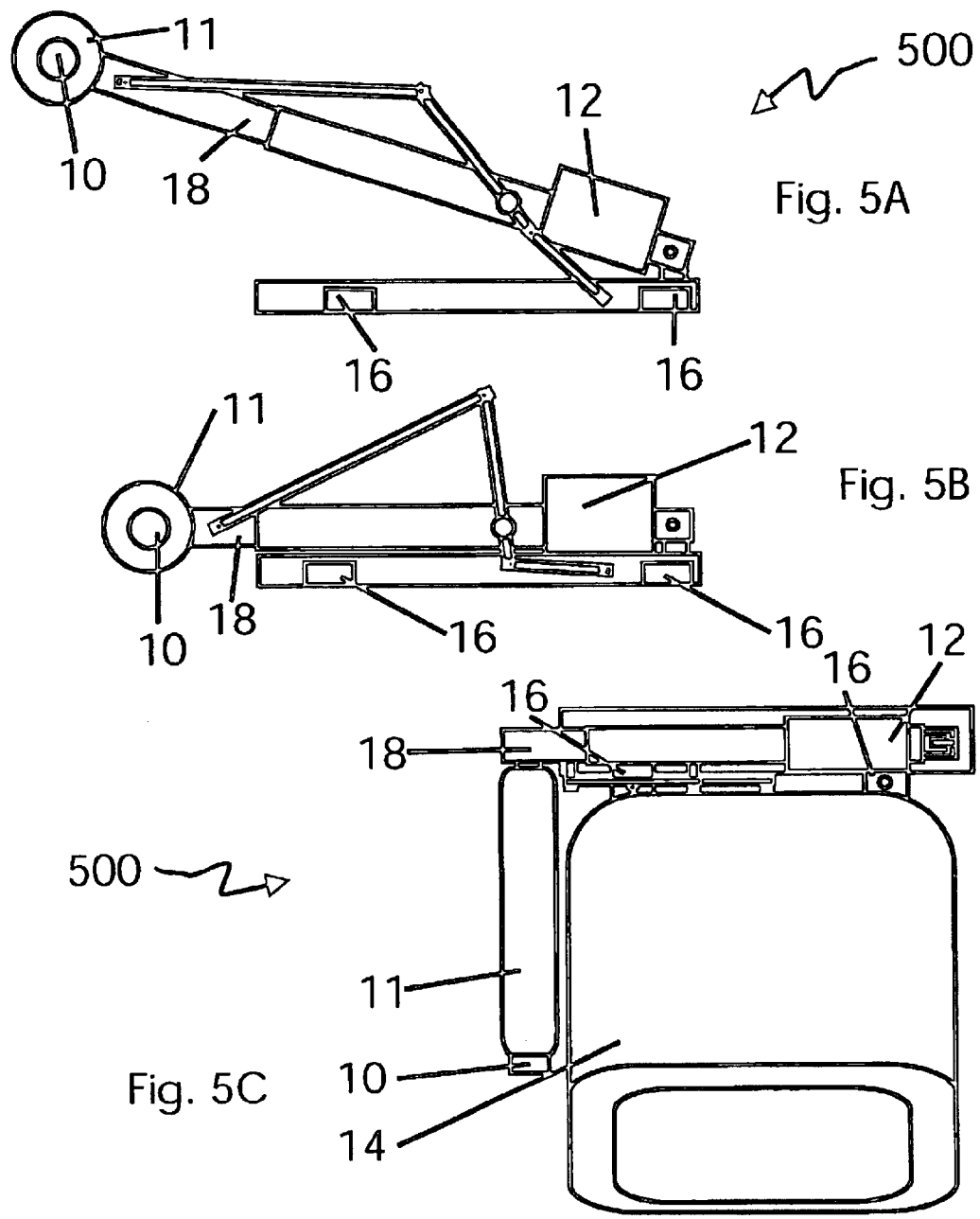

_US 6,739,642 B1_

ELECTRICALLY ACTUATED LIFTING AND TRANSFERRING APPARATUS

CROSS-REFERENCE TO RELATED APPLICATIONS

This patent application claims priority to U.S. Provisional Patent Application No. 60/352,209, filed Jan. 29, 2002, which is hereby incorporated by reference herein in its entirety.

FIELD OF THE INVENTION

The present invention relates generally to assisting disabled persons when entering and exiting a vehicle and, more particularly, to an electrically actuated lifting and transferring apparatus for assisting disabled persons when entering and exiting a vehicle.

BACKGROUND OF THE INVENTION

Due to limited or constrained movement capability, disabled persons often have difficulty when entering and exiting a vehicle. The difficulty generally occurs due to the level of the vehicle seats. That is, when entering a vehicle, a person generally has to transition from a standing position outside the vehicle to a seated position inside the vehicle. This transition generally involves squatting down and then rotating on a vehicle seat, which are often difficult maneuvers for disabled persons. Oppositely, when exiting a vehicle, a person generally has to transition from a seated position inside the vehicle to a standing position outside the vehicle. This transition generally involves rotating on a vehicle seat and then rising up to a standing position, which are often difficult maneuvers for disabled persons.

Due to the aforementioned difficulties when entering and exiting a vehicle, disabled persons often need assistance when entering and exiting a vehicle. However, oftentimes there is no one available to assist a disabled person enter and/or exit a vehicle. Also, disabled persons would generally prefer not to require assistance when entering and exiting a vehicle.

Thus, in view of the foregoing, it would be desirable to provide an apparatus for assisting disabled persons when entering and exiting a vehicle.

SUMMARY OF THE INVENTION

According to the present invention, an electrically actuated lifting and transferring apparatus for assisting disabled persons when entering and exiting a vehicle is provided. In one particular exemplary embodiment, the apparatus comprises a horizontal lifting bar disposed longitudinally alongside a seat of the vehicle between the seat and a door opening of the vehicle. The apparatus also comprises an electrical actuator indirectly coupled to the horizontal lifting bar for forcing the horizontal lifting bar between a lowered position directly adjacent and level with the seat and a raised position away from and above the seat. The apparatus further comprises at least one mounting bracket for securing an assembly comprising the horizontal lifting bar and the electrical actuator directly to the seat.

In accordance with other aspects of this particular exemplary embodiment of the present invention, the apparatus may further beneficially comprise at least one intermediate support member for coupling the horizontal lifting bar to the electrical actuator.

In accordance with further aspects of this particular exemplary embodiment of the present invention, the horizontal lifting bar may beneficially include a rotating cushion disposed around at least a portion of an outer surface thereof for cushioning a user's body when being lowered or raised by the horizontal lifting bar.

In accordance with additional aspects of this particular exemplary embodiment of the present invention, the apparatus may further beneficially comprise a quick release mechanism for uncoupling the horizontal lifting bar from the assembly.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 1A shows a rear view of an unequal arm style version of an electrically actuated lifting and transferring apparatus in a down position in accordance with the present invention.

FIG. 1B shows a rear view of an unequal arm style version of an electrically actuated lifting and transferring apparatus in an up position in accordance with the present invention.

FIG. 1C shows a top view of an unequal arm style version of an electrically actuated lifting and transferring apparatus in a down position in accordance with the present invention.

FIG. 2A shows a rear view of a fixed angle actuator style version of an electrically actuated lifting and transferring apparatus in a down position in accordance with the present invention.

FIG. 2B shows a rear view of a fixed angle actuator style version of an electrically actuated lifting and transferring apparatus in an up position in accordance with the present invention.

FIG. 2C shows a top view of a fixed angle actuator style version of an electrically actuated lifting and transferring apparatus in a down position in accordance with the present invention.

FIG. 3A shows a rear view of a divergent bearing race style version of an electrically actuated lifting and transferring apparatus in a down position in accordance with the present invention.

FIG. 3B shows a rear view of a divergent bearing race style version of an electrically actuated lifting and transferring apparatus in an up position in accordance with the present invention.

FIG. 3C shows a top view of a divergent bearing race style version of an electrically actuated lifting and transferring apparatus in a down position in accordance with the present invention.

FIG. 5A shows a rear view of a guided actuator with bellcrank linkage style version of an electrically actuated lifting and transferring apparatus in an up position in accordance with the present invention.

FIG. 5B shows a rear view of a guided actuator with bellcrank linkage style version of an electrically actuated lifting and transferring apparatus in a down position in accordance with the present invention.

FIG. 5C shows a top view of a guided actuator with bellcrank linkage style version of an electrically actuated lifting and transferring apparatus in a down position in accordance with the present invention.

DETAILED DESCRIPTION OF EXEMPLARY EMBODIMENT(S)

The present invention comprises an electrically actuated electrically actuated lifting and transferring apparatus for disabled persons designed to facilitate the entry and egress process into and out of a vehicle. It is designed to be useful both for ambulatory and non-ambulatory users. Its primary functions are: 1.) to provide powered level changes for non-ambulatory users when transferring from a vehicle into a wheelchair or other mobility device; or 2.) to function as a powered standing aid bringing a user to a standing position from a sitting position when exiting a vehicle or to a sitting position from a standing position when entering a vehicle.

Figure 4A:
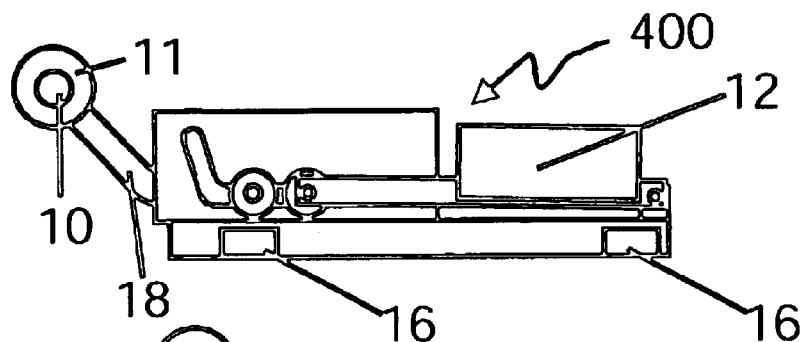
FIG. 4A shows a rear view of a slotted plate style version of an electrically actuated lifting and transferring apparatus in a down position in accordance with the present invention.
Figure 4B:
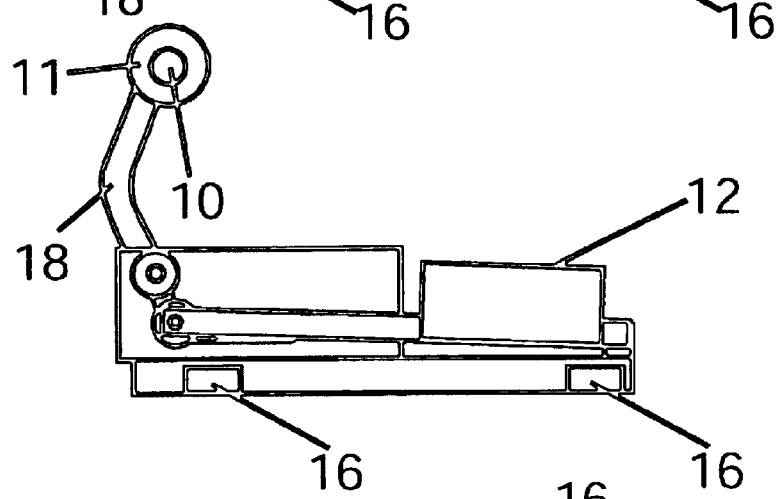
FIG. 4B shows a rear view of a slotted plate style version of an electrically actuated lifting and transferring apparatus in an up position in accordance with the present invention.
Figure 4C:
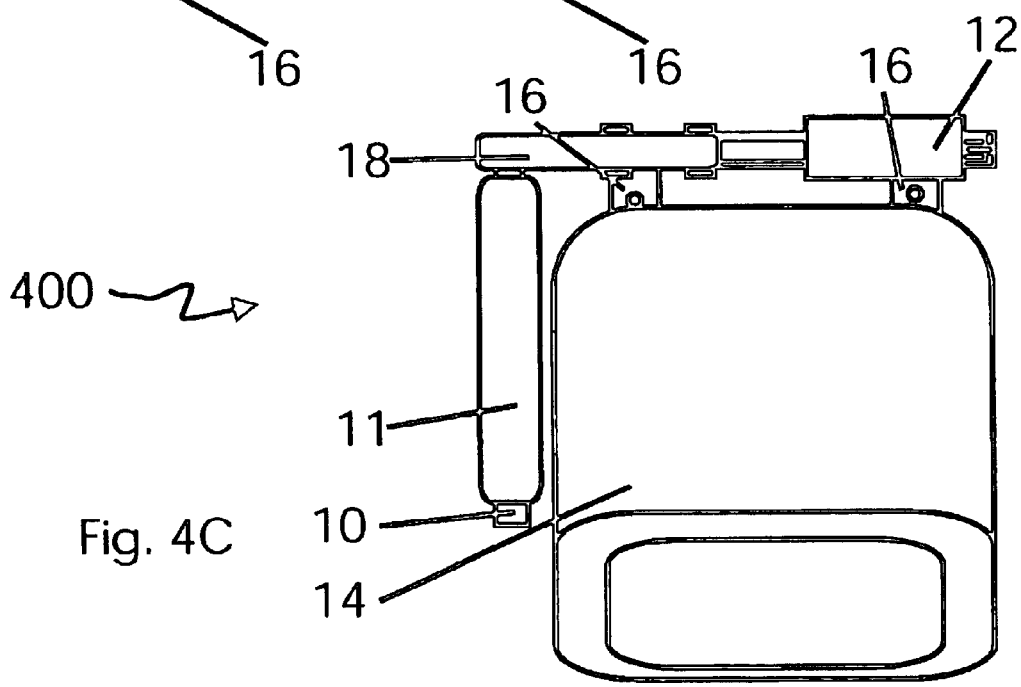
FIG. 4C shows a top view of a slotted plate style version of an electrically actuated lifting and transferring apparatus in a down position in accordance with the present invention.
Figure 6A:
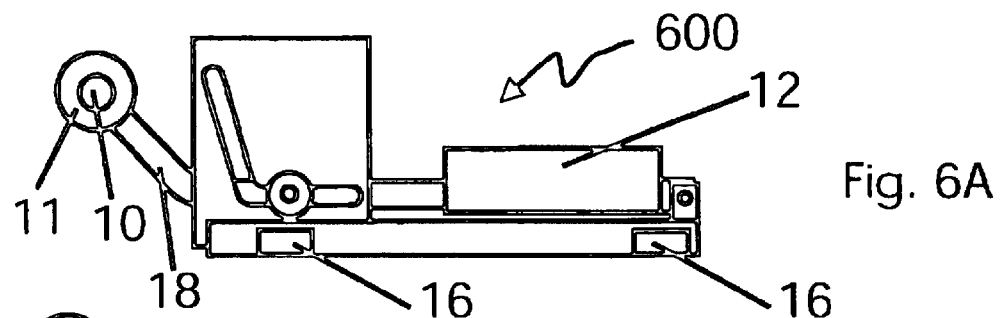
FIG. 6A shows a rear view of a guided actuator with slotted plate style version of an electrically actuated lifting and transferring apparatus in a down position in accordance with the present invention.
Figure 6B:
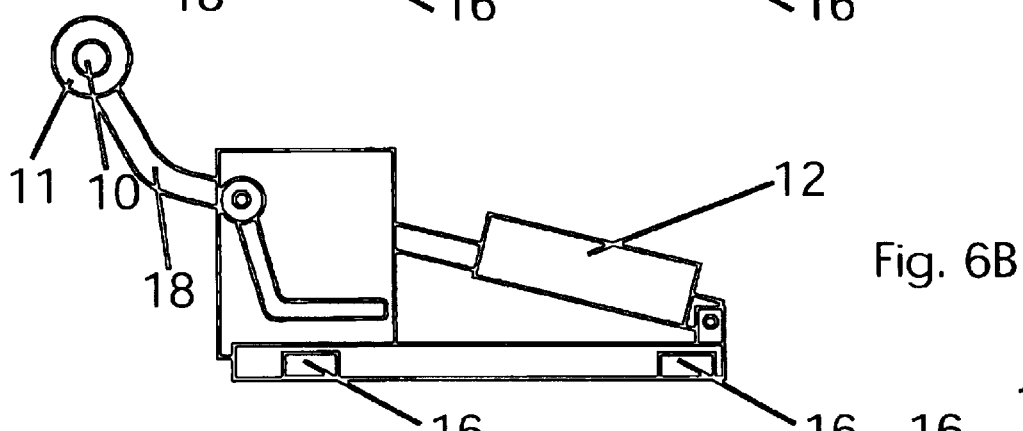
FIG. 6B shows a rear view of a guided actuator with slotted plate style version of an electrically actuated lifting and transferring apparatus in an up position in accordance with the present invention.
Figure 6C:
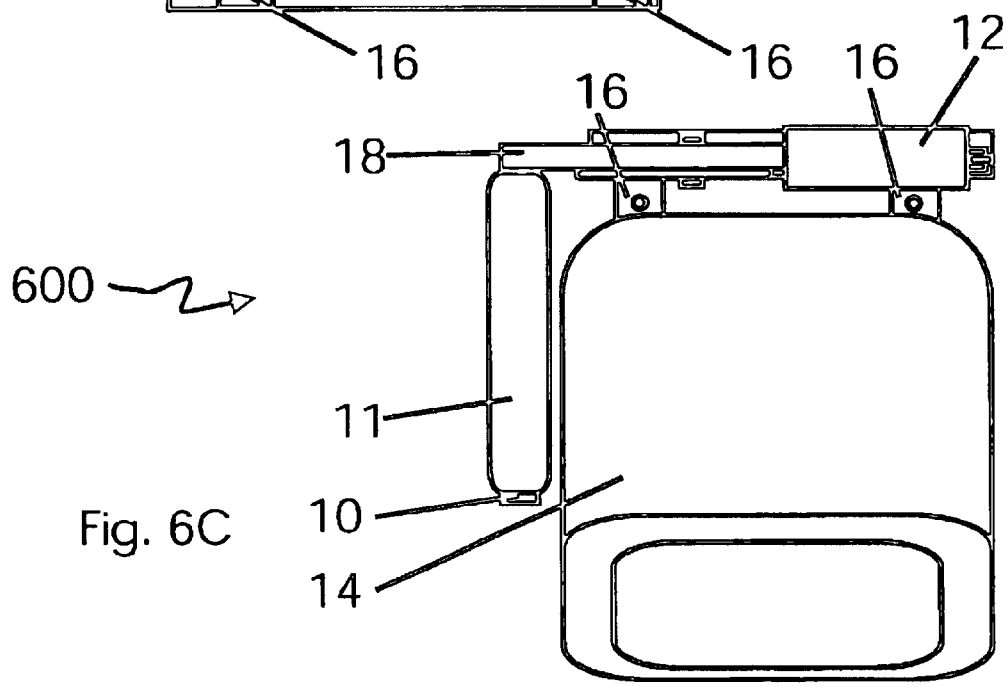
FIG. 6C shows a top view of a guided actuator with slotted plate style version of an electrically actuated lifting and transferring apparatus in a down position in accordance with the present invention.

The present invention may be realized in a variety of embodiments. For example, FIGS. 1A–1C show an unequal arm style version of an electrically actuated lifting and transferring apparatus 100 in accordance with the present invention. FIGS. 2A–2C show a fixed angle actuator style version of an electrically actuated lifting and transferring apparatus 200 in accordance with the present invention. FIGS. 3A–3C show a divergent bearing race style version of an electrically actuated lifting and transferring apparatus 300 in accordance with the present invention. FIGS. 4A–4C show a slotted plate style version of an electrically actuated lifting and transferring apparatus 400 in accordance with the present invention. FIGS. 5A–5C show a guided actuator with bellcrank linkage style version of an electrically actuated lifting and transferring apparatus 500 in accordance with the present invention. FIGS. 6A–6C show a guided actuator with slotted plate style version of an electrically actuated lifting and transferring apparatus 600 in accordance with the present invention.

In each of the above-mentioned embodiments, for an ambulatory user entering a vehicle, the user opens the door of the vehicle, and raises a horizontal lifting bar 10 of the electrically actuated lifting and transferring apparatus to an "up" position using an electronic switch (not shown) located in either a convenient position on the door or dashboard of the vehicle or on a handheld pendant control. The electronic switch is electrically connected, either directly (e.g., hard wired) or indirectly (e.g., wireless), to an electrical actuator 12 of the electrically actuated lifting and transferring apparatus, for controlling the position of the horizontal lifting bar 10 of the electrically actuated lifting and transferring apparatus either directly or through the use of one or more intermediate support members 18. Then, facing outward from the vehicle, the user positions his/her buttocks on the horizontal lifting bar 10 of the electrically actuated lifting and transferring apparatus. The user then lowers himself/herself to a convenient "down" position using the electronic switch so as to allow himself/herself to move sideways into a seated position in the vehicle.

When exiting the vehicle, the user slides towards the exterior of the vehicle facing outwards with his/her buttocks positioned above the horizontal lifting bar 10 of the electrically actuated lifting and transferring apparatus. The user then raises himself/herself to a convenient "up" position using the electronic switch so as to allow the user to assume a standing position.

In each of the above-mentioned embodiments, a non-ambulatory user uses the electrically actuated lifting and transferring apparatus in a manner similar to an ambulatory user, except that, in lieu of using the electrically actuated lifting and transferring apparatus to facilitate standing, the user uses the electrically actuated lifting and transferring apparatus as an elevation device to facilitate transferring. For example, if the user has difficulty performing a transfer due to a difference in height between origination and destination transfer levels, the user transfers onto the horizontal lifting bar 10 of the electrically actuated lifting and transferring apparatus at the origination transfer level, adjusts the position of the horizontal lifting bar 10 of the electrically actuated lifting and transferring apparatus using the electronic switch according to his/her needs (i.e., at of close to the destination transfer level), and then completes the transfer of himself/herself to the destination transfer level.

The electrically actuated lifting and transferring apparatus has many features and benefits that have heretofore not been provided. For example, the electrically actuated lifting and transferring apparatus preferably mounts directly to a seat 14 of a vehicle with mounting brackets 16 so that it is at the correct position no matter how the seat 14 is adjusted in the fore, aft, up, or down positions, particularly in the case of a power seat base. Also, the electrically actuated lifting and transferring apparatus is very easy to install because the counting brackets 16 are preferably attached along slide tracks (not shown) of the seat 14, and slide track configurations are relatively consistent from vehicle to vehicle. Further, the electrically actuated lifting and transferring apparatus maximizes legroom and avoids intrusion into the area adjacent to the vehicle door where manufacturers are increasingly locating seat belt mounting points, seat belt retractor mechanisms, door-mounted map holders, large seat levers and switches, and most importantly side airbags. Additionally, the electrically actuated lifting and transferring apparatus has a wedge-shaped outer package, which, combined with a unique bearing race design, allows for maximum stroke and optimum length and trajectory with extremely compact stored dimensions.

The location of the electrically actuated lifting and transferring apparatus in front of the seat 14 allows for installation of the electrically actuated lifting and transferring apparatus without interfering with or requiring modification of key components of the vehicle, such as seat belt attachment assemblies, power seat controls and levers, and trim panels. Also, as seats 14 have grown wider and the space between door trim panels and seat cushions has thus become smaller, the practicality of locating lifting mechanisms in this area has diminished.

The electrically actuated lifting and transferring apparatus is attached to the moveable portion of the vehicle seat 14 with mounting brackets 16. This insures that fore/aft or up/down adjustments to the seat 14 will not affect the location of the horizontal lifting bar 10 of the electrically actuated lifting and transferring apparatus with respect to the seat cushion. This feature also allows for easier installation, due to the relative consistency of bolt patterns of the seat 14 as they typically attach slide tracks for the seat 14 to the upper portion of the seat 14 when compared to the wide variety of floorboard arrangements.

The horizontal lifting bar 10 of the electrically actuated lifting and transferring apparatus follows a parabolic motion which closely parallels the natural motion required for safe and easy vehicle entry and egress. That is, the initial motion for all of the above-mentioned embodiments of the electrically actuated lifting and transferring apparatus includes primarily an outward motion to move the user away from the vehicle seat 14, followed by an increasingly upward motion to achieve the desired exit height. This motion is exactly the motion performed by an able-bodied person when exiting a vehicle. This motion is reversed when entering a vehicle, which resembles the motion performed by an able-bodied person when entering a vehicle.

The horizontal lifting bar 10 of the electrically actuated lifting and transferring apparatus has a cushion 11, which can rotate to avoid undesirable abrasion with the user's body as the horizontal lifting bar 10 moves from the "up" to the "down" position, and vice-versa. The horizontal lifting bar 10 of the electrically actuated lifting and transferring apparatus also has a quick-release mechanism which allows for easy removal when not in use.

All of the above-mentioned embodiments of the electrically actuated lifting and transferring apparatus, with the exception of the fixed angle actuator style version of FIG. 2, provide a long motion relative to the space which the electrically actuated lifting and transferring apparatus occupies in its stored position. This is of particular concern in an area such as the area in front of the front seat 14 of an automobile, where the adjacent floorboard, drive shaft tunnel, console, pedals and "A"-pillar pose significant space and ergonomic constraints.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. An electrically actuated lifting and transferring apparatus for assisting disabled persons when entering and exiting a vehicle, the apparatus comprising:

a horizontal lifting bar disposed longitudinally alongside a seat of the vehicle between the seat and a door opening of the vehicle;

an electrical actuator indirectly coupled to the horizontal lifting bar for forcing the horizontal lifting bar between a lowered position directly adjacent and level with the seat and a raised position away from and above the seat; and at least one mounting bracket for securing an assembly comprising the horizontal lifting bar and the electrical actuator directly to the seat.

2. The apparatus as defined in claim 1, further comprising:

at least one intermediate support member for coupling the horizontal lifting bar to the electrical actuator.

3. The apparatus as defined in claim 1, wherein the horizontal lifting bar includes a rotating cushion disposed around at least a portion of an outer surface thereof for cushioning a user's body when being lowered or raised by the horizontal lifting bar.

4. The apparatus as defined in claim 1, further comprising:

a quick release mechanism for uncoupling the horizontal lifting bar from the assembly.

* * * * *